United States Patent Office.

OLE H. MELLUM, OF CHICAGO, ILLINOIS, ASSIGNOR OF TWO-THIRDS TO ALBERT STEPHENSON AND PAUL ARNOLD, BOTH OF SAME PLACE.

COMPOSITION FOR CLEANING METAL.

SPECIFICATION forming part of Letters Patent No. 314,256, dated March 24, 1885.

Application filed December 18, 1884. (No specimens.)

*To all whom it may concern:*

Be it known that I, OLE H. MELLUM, residing at Chicago, in the county of Cook and State of Illinois, have invented a new and useful Composition of Matter to be Used in Cleaning Metals, of which the following is a specification.

My composition consists of the following ingredients, combined in about the proportions stated, viz: pure water, one gallon; oxalic acid, two pounds; tripoli, two pounds; aniline, one ounce.

To form my composition for attaining the best results, I dilute the oxalic acid in pure water and allow it to stand for about six days. I then add the tripoli and the aniline, at the same time vigorously agitating the mixture. The aniline should be thoroughly dissolved before adding.

In using my composition, the vessel in which it is contained should be well shaken, so as to produce a thorough union of the different ingredients. A piece of cloth, or, better, a handfull of cotton waste, is then moistened with the liquid and the metal rubbed. After the latter has become bright and all its tarnish removed (and this requires but slight labor and a short time) it should be polished off with a piece of dry cloth or waste.

The efficacy of my composition will be found to increase with each repeated application, at least so far as concerns its retentive qualities.

I am aware that various compositions for cleaning metals (and some of them containing several of the ingredients used by me) have been used; but to my knowledge none have proved entirely successful, and with none could the metal be polished so quickly, and retain the brightness of its polish so long, as with the application of my invention, and with none has aniline been used.

My experiments have shown that the aniline not only imparts a brilliant polish, but a degree of permanency and a gilt-like effect unattainable with any other substance with which I am familiar.

It will be apparent to those familiar with the art that different acids—muriatic, for instance—may be used in place of oxalic, and that prepared chalk and similar substances may be substituted for tripoli with indifferent success. Hence I do not wish to be confined to the precise materials mentioned, considering, as I do, that the aniline or its equivalent constitutes the essential feature of my invention as used in connection with the ingredients I have recited or with their equivalents. Slight variations, too, may be made in the proportions; but I have given the ingredients together with their proportions as being the best for attaining the desired result.

I claim as my invention—

1. The within-described compound for cleaning metal, the essential of which is aniline.

2. The within-described composition for cleaning metal, consisting of oxalic acid, tripoli, aniline, and pure water in or about the proportions stated.

In testimony whereof I affix my signature in presence of two witnesses.

OLE H. MELLUM.

Witnesses:
DAVID P. MAITLAND,
PAUL ARNOLD.